Nov. 9, 1954   B. O. AUSTIN ET AL   2,694,173
REGULATING SYSTEM
Filed March 11, 1950
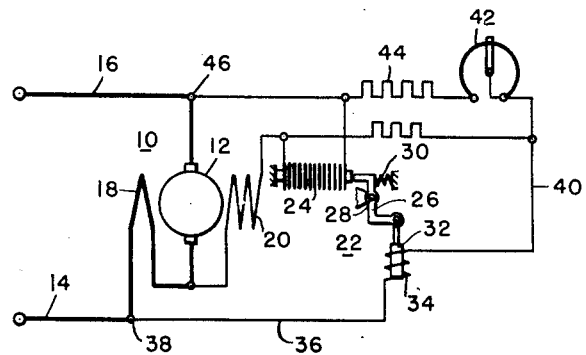
WITNESSES:
E. A. M?Closkey.
Tw. L. Groome
INVENTORS
Bascum O. Austin and
George R. Douglas.
BY
James R. Ely
ATTORNEY

United States Patent Office 2,694,173
Patented Nov. 9, 1954

2,694,173

REGULATING SYSTEM

Bascum O. Austin, Lima, Ohio, and George R. Douglas, Pittsburgh, Pa., assignors to Westinghouse Electric Corporation, East Pittsburgh, Pa., a corporation of Pennsylvania Application March 11, 1950, Serial No. 149,152

4 Claims. (Cl. 322—28)

This invention relates to regulating systems, and in particular to regulating systems of the pile type for aircraft.

Carbon-pile regulators are widely used in aircraft for regulating the voltage of generators. In use, it is found that the stack of the pile and the energizing windings thereof are greatly affected by the increase in temperature developed in the regulator during operation. Many attempts have been made heretofore to build mechanical temperature compensators as a part of the regulator, but in practically all instances, such compensators add weight to the regulator, increase the bulk thereof, or are otherwise undesirable for the particular application in aircraft.

An object of this invention is to provide a regulating system for aircraft use in which compensation is provided for changes in expansion of the stack of a pile regulator under temperature changes.

Another object of this invention is to provide, in a regulating system having a pile regulator, for minimizing the effect of changes in the resistance of the energizing winding of the regulator as the temperature thereof varies, and to simultaneously provide for compensating for changes in the resistance of the pile occasioned by expansion of the pile as the temperature thereof changes.

Other objects of this invention will become apparent from the following description, when taken in conjunction with the accompanying drawing, the single figure of which is a diagrammatic view of circuits and apparatus embodying the teachings of this invention.

Referring to the drawing, this invention is illustrated as embodied in a regulating system for a generator 10 driven by a suitable prime mover (not shown). The generator 10 comprises armature windings 12 connected through conductors 14 and 16 to supply a load (not shown), the generator 10 being provided also with a series field winding 18 and a shunt field winding 20.

In order to control the excitation of the generator 10 so as to maintain a predetermined voltage, a pile regulator 22 is illustrated as having a stack 24 of discs of resistance material, for example carbon, connected in series circuit with the shunt field winding 20, the series connected shunt field winding 20 and the stack 24 being connected across the armature 12. The pile regulator 22 may be of the usual aircraft type, for example, such as is illustrated in the Newton Patent No. 2,268,718, or later embodiments thereof. For purposes of illustration, however, the pile regulator 22 is illustrated as having a lever arm 26 pivoted as at 28, one end of the lever arm 26 being biased as by the spring 30 to apply pressure to the stack 24, the other end of the lever 26 being secured to an electromagnet comprising a core member 32 and an energizing winding 34 therefor. Thus the stack 24 is normally under pressure of the spring 30 to reduce the resistance of the stack to a minimum, the resistance of the stack 24 being varied by controlling the energization of the winding 34.

In the embodiment illustrated, the energizing winding 34 has one end thereof connected as by conductor 36 to a terminal 38 of the generator 10, the other end of the winding 34 being connected through conductor 40, an adjustable resistor 42 and a fixed resistor 44 to a terminal 46 of the generator 10. The adjustable resistor 42 is provided in order to adjust the initial energization of the winding 34 so as to maintain a predetermined pressure on the stack 24 and maintain a predetermined voltage of the generator 10 for a given load condition.

As is well known in the aircraft industry, the stack 24 and the energizing winding 34 of the pile regulator 22 are affected by temperature changes encountered during operation of the stack. Thus the temperature changes effects changes in the expansion and consequently the pressure of the stack 24 to change the resistance thereof, and at the same time the resistance of the winding 34 also varies in accordance with the change in temperature. For this reason, the resistor 44 is selected to function as a swamping resistor for minimizing the effect of temperature changes on the energizing winding 34. The resistor 44 is therefore of large ohmic value as compared to the resistance of the winding 34, and in practice, is preferably of a resistance equal to about four times the resistance of the winding 34. When the resistor 44 is of such value, it is apparent that any change in the resistance due to temperature changes of the winding 34, is only a very small percentage change with respect to the resistance of the energizing winding circuit including the resistors 42 and 44. The resistor 44 therefore effectively minimizes the change in resistance due to temperature changes of the winding 34.

In addition to functioning as a swamping resistor, the resistor 44 is also selected for the purpose of compensating for changes in resistance of the stack 24 caused by the change in pressure in the stack 24 as the temperature changes. In practice, the resistor 44 is preferably positioned with respect to the stack 24 so that it will be subject to approximately the same temperature changes as that of the stack 24. In order to effectively compensate for the resistance changes due to the temperature variations, the resistor 44 is preferably formed of a material which has a coefficient of resistance per degree centigrade change comparable to the coefficient of resistance of the stack 24. Thus as the temperature of the stack 24 and also the resistor 44 increases, thereby effecting an increase in the resistance of the stack 24, the resistance of the compensating resistor 44 will also increase in a proportionte amount so as to limit the flow of current in the energizing winding 34 in proportion to the change in resistance of the stack 24. Instead of positioning the resistor 44 to be subjected to the same temperature variations as the stack 24, the resistor 44 may be located remotely with respect to the stack 24. In such case the resistor 44 is so designed that it will have mass and electrical resistivity characteristics corresponding to that of the stack 24 in order that substantially the same temperature changes and consequently resistance changes will be encountered in the resistor 44 as are found in the stack 24.

As the current flow through the energizing winding 34, and consequently the ampere turns thereof, are thus controlled, it is apparent that the energizing winding 34 functions in cooperation with the spring 30 to vary the pressure applied to the stack 24 to change the resistance of the stack 24 an amount substantially equal to the change in resistance resulting from the change in the temperature of the stack. The resistor 44 in series circuit with the energizing winding 34 thus performs a twofold function in that it definitely minimizes the effect of temperature changes on the energizing winding 34 and at the same time compensates for the change in resistance of the stack 24 occasioned by change in pressure thereof with temperature changes, thereby giving a very stable regulation of the voltage of the generator 10.

It is of course obvious that the resistor 44 also functions when the system is first energized and the resistor 44 is cold, to permit more current to flow in the energizing winding 34 to thereby effect a decrease in the pressure applied to the stack 24 to increase the resistance thereof, and thereby prevent overexcitation of the generator 10. In systems of this type, as used prior to this invention without the compensating features of the resistor 44, it has been found that the regulators were inefficient in operation, permitting variations of as great as one and a half to two volts in a twenty-eight volt direct-current system. With the present invention, however, the voltage is controlled to within one-quarter of a volt in such systems.

The system of this invention is efficient and stable in operation. It is formed of standard component parts and can be readily reproduced. The system also has the advantage that compensation for resistance changes is accomplished without increasing either the weight or the bulk of the pile regulators embodied in the regulating system.

We claim as our invention:

1. In a regulating system for a generator provided with a shunt field winding, the combination comprising, a pile regulator having a pressure responsive stack of discs of resistance material connected to vary the excitation of the generator, a winding disposed to be energized in response to the generator voltage for controlling the pressure applied to the stack, the stack being affected by heat of varying magnitude during operation of the regulator to vary the pressure and resistance thereof, and a resistor connected in circuit relation with the energizing winding and disposed to be subject to heat of substantially the same magnitude as that heat affecting the resistance of the stack, said resistor having an ohmic resistance per degree centigrade change comparable to the ohmic resistance change of the stack under the variable pressure developed by the change in temperature to vary the ampere turns of the energizing winding as the temperature of the stack changes to effectively compensate for pressure changes resulting from changes in the temperature of the stack.

2. In a regulating system for a generator provided with a shunt field winding, the combination comprising, a pile regulator having a pressure responsive stack of discs of resistance material connected in series circuit relation with the shunt field winding, a winding disposed to be energized in response to the generator voltage for controlling the pressure applied to the stack, the stack and energizing winding being affected by heat of varying magnitude during operation of the regulator to vary the resistance of the winding and the pressure and resistance of the stack, and a resistor connected in series circuit relation with the energizing winding and disposed to be subject to heat of substantially the same magnitude as that heat affecting the resistance of the stack, said resistor having an ohmic resistance per degree centigrade change comparable to the ohmic resistance change of the stack under the variable pressure developed by the change in temperature to vary the ampere turns of the energizing winding as the temperature of the stack changes to thereby compensate for changes in temperature of the stack.

3. In a regulating system for a generator provided with a shunt field winding, the combination comprising, a pile regulator having a pressure responsive stack of discs of resistance material connected in series circuit relation with the shunt field winding, an energizing winding for controlling the pressure applied to the stack, the energizing winding being connected across the generator to be responsive to the voltage thereof, the stack and energizing winding being affected by heat of varying magnitude during operation of the regulator to vary the resistance of the winding and the pressure and resistance of the stack, and a swamping resistor having a large resistance as compared to the resistance of the energizing winding connected in series circuit therewith and disposed to be subject to heat of substantially the same magnitude as that heat affecting the resistance of the stack, the swamping resistor also having an ohmic resistance per degree centigrade change comparable to the ohmic resistance change of the stack under the variable pressure developed by the change in temperature to vary the ampere turns of the energizing winding as the temperature of the stack changes and thereby compensate for changes in temperature of the stack.

4. In a regulating system for a generator provided with a field winding, the combination comprising, a pile regulator having a pressure responsive stack of discs of resistance material connected to vary the excitation of the generator, a winding disposed to be energized in response to the generator voltage for controlling the pressure applied to the stack, the stack and energizing winding being affected by heat of varying magnitude during operation of the regulator to vary the resistance of the winding and the pressure and resistance of the stack, and a resistor connected in series circuit with the energizing winding and disposed to be subject to heat of substantially the same magnitude as that heat affecting the resistance of the stack, the resistor having a resistance of about four times that of the energizing winding for minimizing the effects of changes in the resistance of the energizing winding occasioned by changes in temperature thereof, the resistor also having an ohmic resistance per degree centigrade change comparable to the ohmic resistance change of the stack under the variable pressure developed by the change in temperature to vary the ampere turns of the energizing winding as the temperature of the stack changes to compensate for such changes in the stack resistance.

References Cited in the file of this patent

UNITED STATES PATENTS

| Number | Name | Date |
|---|---|---|
| 1,503,085 | Blake | July 29, 1924 |
| 1,850,449 | Creveling | Mar. 22, 1932 |
| 2,067,604 | Godsey | Jan. 12, 1937 |
| 2,170,193 | Godsey | Aug. 22, 1939 |
| 2,424,464 | Honeywell | July 22, 1947 |
| 2,494,397 | Lusk | Jan. 10, 1950 |